United States Patent
Archan

(10) Patent No.: US 9,903,458 B2
(45) Date of Patent: Feb. 27, 2018

(54) DIFFERENTIAL GEAR

(71) Applicant: Magna Powertrain GmbH & Co KG, Lannach (AT)

(72) Inventor: Josef Archan, Frannach (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 15/097,679

(22) Filed: Apr. 13, 2016

(65) Prior Publication Data
US 2016/0305526 A1 Oct. 20, 2016

(30) Foreign Application Priority Data

Apr. 20, 2015 (DE) .................. 10 2015 207 141

(51) Int. Cl.
*F16H 48/40* (2012.01)
*F16H 48/08* (2006.01)

(52) U.S. Cl.
CPC ....... *F16H 48/40* (2013.01); *F16H 2048/085* (2013.01)

(58) Field of Classification Search
CPC .................. F16H 48/40; F16H 2048/085
See application file for complete search history.

(56) References Cited

U.S. PATENT DOCUMENTS

| | | | | |
|---|---|---|---|---|
| 1,332,535 A * | 3/1920 | Baker | ............... | F16H 48/06 475/230 |
| 3,310,999 A * | 3/1967 | Griffith | ............... | F16H 48/08 475/246 |
| 3,546,969 A * | 12/1970 | Gibson | ............... | F16H 48/08 417/199.1 |
| 6,045,479 A * | 4/2000 | Victoria | ............... | F16H 48/08 475/160 |
| 6,379,277 B1 * | 4/2002 | Victoria | ............... | F16H 48/08 475/231 |
| 7,207,110 B2 * | 4/2007 | Pascoe | ............... | F16H 48/08 29/893.2 |
| 7,294,084 B2 * | 11/2007 | Koehler | ............... | F16H 48/08 475/230 |
| 7,465,247 B2 * | 12/2008 | Bock | ............... | F16H 48/08 475/230 |
| 2009/0266198 A1 * | 10/2009 | Nosakowski | ............... | F16H 48/08 74/606 R |

FOREIGN PATENT DOCUMENTS

| | | |
|---|---|---|
| DE | 102004034736 A1 | 2/2006 |
| DE | 102012014950 A1 | 1/2013 |
| FR | 2932543 | * 12/2009 |
| WO | WO 0188414 | * 11/2001 |

* cited by examiner

Primary Examiner — Sherry L Estremsky
(74) Attorney, Agent, or Firm — Dickinson Wright PLLC

(57) ABSTRACT

A differential gear for a motor vehicle includes a housing with a first housing part and a second housing part, and at least one bolt on which two differential gear wheels are arranged. The first housing part is configured integrally with an input element and the second housing part has at least two mutually opposing receiver openings. Bolt ends of the bolt are received in the receiver openings so that end faces of the bolt in the region of the two bolt ends, together with the outside of the second housing part, form a housing outer face. The first housing part, the second housing part, and the bolt are connected together by a peripheral radial weld seam.

10 Claims, 1 Drawing Sheet

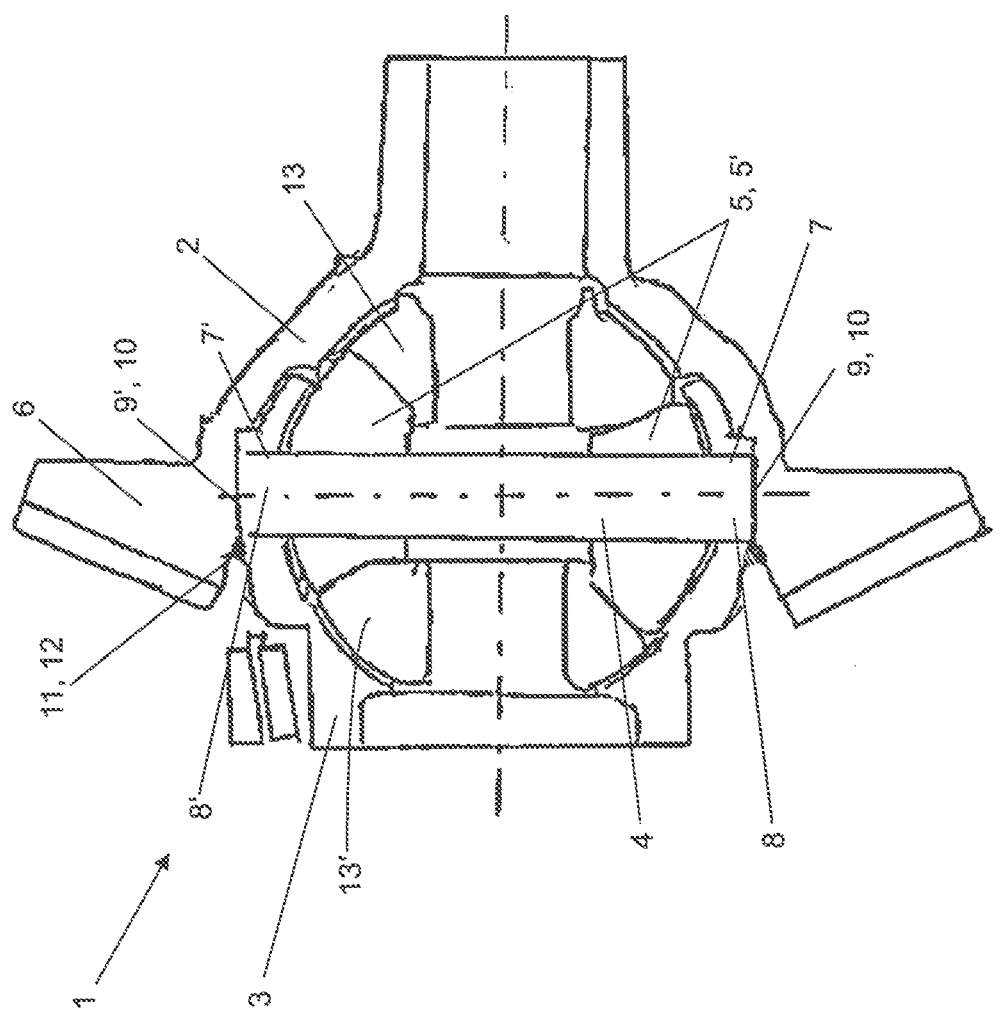

DIFFERENTIAL GEAR

CROSS-REFERENCE TO RELATED APPLICATIONS

This application claims the benefit and priority of German Application No. DE 102015207141.3 filed on Apr. 20, 2015. The entire disclosure of the above application is incorporated herein by reference.

TECHNICAL FIELD

The present disclosure relates generally to a differential gear for a motor vehicle and, more particularly, to a differential gear comprising a housing with a first housing part and a second housing part.

BACKGROUND

This section provides background information related to the present disclosure which is not necessarily prior art.

Differential gears, also known as differentials, are used on drive axles in motor vehicles and serve primarily to transmit drive torque from a machine-driven gearbox output to a pair of ground-engaging wheels via a pair of axle half-shafts.

A differential gear is a special planetary gear, which in case of need, such as when the motor vehicle is cornering, ensures compensation for the different travel distances covered by the two wheels of the drive axle in that the wheels rotate at different speeds. Such a differential gear allows the wheels of an axle of a motor vehicle to turn at different rotational speeds.

For this, usually a differential cage is driven via a bevel gear or a spur pinion. The differential cage is connected to a crown wheel or a spur gear. Furthermore, a differential gear comprises at least two, usually however four, differential bevel gear wheels mounted rotatably on a bolt. The differential bevel gear wheels are not connected torque-transmissively together, but are connected torque-transmissively to a pair of axle bevel gear wheels. The axle bevel gear wheels are each fixedly connected to one of the axle half-shafts which, in turn, are each connected to one of the wheels.

The housing of a differential gear in the prior art is often designed in two pieces, amongst other reasons to increase the strength and facilitate installation, wherein the housing thus comprises a differential cage and a differential cover. The differential cage is connected to the (input) crown wheel. In the prior art, the connection of the two housing parts and the crown wheel is formed in widely varying ways. Furthermore, various forms of bolt fixing inside the differential housing are possible.

Document DE 10 2004 034 736 A1 describes for example a differential for a vehicle axle with a two-piece housing, in which the differential cage is welded to the differential cover and the crown wheel with only one radial weld seam. The differential cage is here configured such that it has a plurality of recesses on its periphery in the flange region of the crown wheel support. The differential cover has segments assigned to the recesses of the differential cage which engage in the recesses of the differential cage. Both the differential cage and the differential cover come together with the crown wheel, and the differential cage, differential cover and crown wheel can then be connected by only one radial weld seam.

The invention presented in document DE 10 2012 014 950 A1 concerns a housing for a differential gear of a motor vehicle, and a differential gear for a motor vehicle. The housing has a first housing part and a second housing part. Respective first parts of at least two receiver openings for respective bearing bolt parts are formed by the first housing part. Second parts of the receiver openings are formed by the second housing part. The housing parts are connected together, forming (complete) receiver openings. In the first separating plane of the housing, depending on the configuration of the receiver openings, a second separating plane is arranged, along which the receiver openings are divided in two. The housing parts are welded together in their first separating plane and where applicable in the second separating plane of the receiver openings. Protection against loss and/or twisting of the bearing bolt parts and/or differential gear wheels may be integrated in one of the housing parts. A 360° weld joint of the two housing parts is described for stronger connection thereof, wherein the receiver openings are structured such that the first halves and the second halves of the receiver openings each have a wall radially on the outside. In this way, a continuous circular weld seam is possible which allows a fixed mutual connection of the two housing parts.

While two-piece housings for differential gears are known and perform satisfactorily for their intended purpose, a need still exists to advance the art and provide alternative two-piece housing configurations for differential gears which optimize installation space requirements and are economical to produce.

SUMMARY

This section provides a general summary of the disclosure and is not intended to be interpreted as a comprehensive disclosure of its full scope or all of its aspects, objectives and advantages.

It is an object of the present disclosure to provide an alternative differential gear for a motor vehicle, allowing a design which is optimized for components and installation space and which is economic to produce.

The object is achieved by a differential gear for a motor vehicle comprising a housing with a first housing part and a second housing part, and at least one bolt on which two differential gear wheels are arranged, wherein the first housing part is configured integrally with an input element and the second housing part is formed to include at least two mutually opposing receiver openings, wherein a bolt end is received in each receiver opening so that end faces of the bolt in the region of the two bolt ends, together with the outside of the second housing part, form a housing outer face, and wherein the first housing part, the second housing part and the bolt are connected together by means of a peripheral radial weld seam.

According to the present disclosure, the differential gear comprises a two-piece housing with a first housing part and a second housing part, and at least one bolt on which at least two differential gear wheels are rotatably arranged.

Due to the two-piece design of the housing, it is guaranteed that the differential gear according to the invention can be produced particularly easily since the housing can be filled with the bolt and a differential gearset having at least one pair of differential gear wheels and a pair of axle gear wheels before the two housing parts are joined together. Also, in this way a stable housing is achieved, since no filling window which weakens the housing need be integrated.

The first housing part of the two-piece housing according to the present disclosure is formed integrally with an input element.

According to the present disclosure, the second housing part of the two-piece housing has at least two receiver openings opposite each other. A bolt end is received in each receiver opening so that end faces of the bolt in the region of the two bolt ends, together with the outside of the second housing part, form a housing outer face.

According to the present disclosure, the first housing part, the second housing part and the bolt are connected together via the single peripheral radial weld seam.

By welding the bolt to the first housing part and the second housing part, a twist and/or slippage of the bolt out of the receiver openings is prevented in a simple manner. No additional components and/or structural solutions for preventing the twisting and/or loss of the bolt are required, thus leading to a differential gear which is optimized for construction space and cost.

In a particularly advantageous embodiment of the differential gear according to the present disclosure, the second housing part is surrounded by the first housing part on the periphery at the housing outer face, at least in regions, wherein an overlap region is formed.

Because of the above-mentioned partial arrangement of the second housing part within the first housing part, a compact construction of the housing of the differential gear is achieved. Also, slippage of the bolt is prevented.

Particularly preferably, the overlap region is configured such that the end faces of the bolt are not completely covered by the first housing part, and thus a connecting region is formed.

In a particularly advantageous embodiment of the differential gear according to the present disclosure, the radial weld seam is formed along the connecting region.

The first housing part, the second housing part and the bolt via its end faces come together in the connecting region, and a connection can be made between the first housing part, the second housing part and the bolt via a single radial weld seam.

Thus firstly a fixed connection between the first housing part and the second housing part is achieved, and secondly a protection against twisting and/or slippage of the bolt. The connection can be implemented in a single working step, which saves production costs and costs of additional material and components.

Advantageously, the radial weld seam can be implemented by means of a laser welding technology.

Preferably, the input element is a crown wheel or a spur gear.

The crown wheel advantageously has a hypoid toothing, wherein however any other type of toothing is conceivable.

In an advantageous refinement of the invention, a radial shaft sealing ring is arranged directly in the first housing part.

It is advantageous if the two-piece housing is made of steel.

The design of the differential gear according to the invention allows the formation of a small, compact and stable housing. Furthermore, the embodiments of the invention described allow production of an economic differential gear which is optimized in terms of materials and components.

Further areas of applicability will become apparent from the description provided herein. The description and specific examples in this summary are intended for purposes of illustration only and are not intended to limit the scope of the present disclosure.

DRAWINGS

The drawing described herein is for illustrative purposes only of one or more selected embodiments and not all possible implementations and is not intended to limit the scope of the present disclosure.

The invention is explained in more detail below with reference to an exemplary embodiment of a differential gear shown in FIG. 1 as a sectional view constructed according to the present disclosure.

DESCRIPTION

An example embodiment of a differential gear is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment may be embodied in many different forms and that neither should be construed to limit the scope of the disclosure. In some example embodiments, well-known processes, well-known device structures, and well-known technologies are not described in detail.

A differential gear 1 is shown in FIG. 1 to comprise a housing with a first housing part 2 and a second housing part 3, a differential gearset having a pair of differential gear wheels 5, 5' and a pair of axle gear wheels, 13, 13', and a bolt 4 on which the differential gear wheels 5, 5' are arranged.

The first housing part 2 is formed integrally with an input element 6. The input element 6 in FIG. 1 is configured as a crown wheel with hypoid toothing.

The second housing part 3 has two mutually opposed receiver openings 7, 7', wherein a bolt end 8, 8' of bolt 4 is received in each of the receiver openings 7, 7'. The bolt ends 8, 8' are received in receiver openings 7, 7' such that end faces 9, 9' of the bolt 4 in the region of the two bolt ends 8, 8', together with the outside of the second housing part 3, form a housing outer face 10.

As shown in FIG. 1, the bolt 4 is configured substantially cylindrical and the receiver openings 7, 7' are formed substantially circular, corresponding to the outer contour of the cylindrical bolt 4. The bolt 4 may however also have any other form, such as for example rectangular. The receiver openings 7, 7' may also be formed arbitrarily, for example rectangular. The receiver openings 7, 7' are substantially configured such that their receiver contour constitutes a counter-piece to the outer contour of the bolt 4.

The second housing part 3 is surrounded by the first housing part 2 on the periphery at the housing outer face 10, at least in regions, whereby an overlap region is formed.

Both the first housing part 2 and the second housing part 3 are substantially bell-shaped and formed to be open at both ends. As shown, the two openings facing away from each other of the first housing part 2 and the second housing part 3 serve to receive respectively a first (right) and a second (left) axle half-shaft, wherein each axle half-shaft connects one of axle gear wheels 13, 13' to a corresponding driven wheel of the motor vehicle.

The overlap region between the first housing part 2 and the second housing part 3 is configured such that the end faces 9, 9' of the bolt 4 are not completely covered by the first housing part 2, and thus a connecting region 12 is formed. As such, the first housing part 2, the second housing part 3, and the bolt 4 are connected together along the connecting region 12 by means of a peripheral radial weld seam 11.

The first housing part 2, the second housing part 3 and the bolt 4 via its end faces 9, 9' come together in the connecting region 12, and a connection can be made between the first housing part 2, the second housing part 3 and the bolt 4 via a single radial weld seam 11. The radial weld seam 12 is formed completely circumferential, i.e. it runs substantially through 360° around the housing outer face 10 of the second housing part.

A radial shaft sealing ring is arranged in the first housing part 2.

LIST OF REFERENCE SIGNS

1 Differential gear
2 First housing part
3 Second housing part
4 Bolt
5, 5' Differential bevel gear wheel
6 Input element
7, 7' Receiver opening
8, 8' Bolt end
9, 9' End face (of bolt)
10 Housing outer face
11 Radial weld seam
12 Connecting region
13, 13' Axle bevel gear wheel

What is claimed is:

1. A differential gear for a motor vehicle comprising a housing with a first housing part and a second housing part, wherein the second housing part is surrounded by the first housing part on the periphery at the housing outer face, at least in regions such that an overlap region is formed, and at least one bolt on which two differential gear wheels are arranged, wherein the first housing part is configured integrally with an input element and the second housing part has at least two mutually opposing receiver openings, wherein a bolt end is received in each receiver opening so that end faces of the bolt in the region of the two bolt ends, together with the outside of the second housing part, form a housing outer face, wherein the overlap region is configured such that the end faces of the bolt are not completely covered by the first housing part such that a connecting region is formed, and wherein the first housing part, the second housing part and the bolt are connected together by a peripheral weld seam.

2. The differential gear according to claim 1, wherein the peripheral weld seam is formed along the connecting region.

3. The differential gear according to claim 2, wherein the peripheral weld seam can be implemented by means of a laser welding technology.

4. The differential gear according to claim 1, wherein the input element is a crown wheel or a spur gear.

5. The differential gear according to claim 4, wherein the crown wheel has a hypoid toothing.

6. The differential gear according to claim 1, wherein the housing is made of steel.

7. A differential gear for a motor vehicle, comprising:
a two-piece housing having a first housing part and a second housing part, the first housing part configured to include an integral input gear and the second housing part configured to include two mutually opposing receiver openings;
a bolt having opposite bolt ends received in the receiver openings such that end faces formed on the bolt ends of the bolt cooperate with the second housing to form a housing outer face; and
a differential gearset including a pair of differential gear wheels rotatably supported on the bolt and a pair of axle gear wheels meshed with the differential wheels;
wherein the second housing part is surrounded by the first housing part at the housing outer face to establish an overlap region of the two-piece housing configured to expose at least a portion of the end faces of the bolt so as to define a peripheral connecting region, and wherein a peripheral weld seam is formed along the connecting region so as to connect each of the first and second housing parts of the two-piece housing and the bolt together.

8. The differential gear of claim 7, wherein the peripheral seam is continuous to surround the periphery of the housing outer face.

9. The differential gear of claim 7, wherein the first housing part is bell-shaped and has a first enlarged portion, wherein the input gear is integrally formed with the first enlarged portion of the first housing part, wherein the second housing part is bell-shaped and has a second enlarged portion configured to be surrounded by the first enlarged portion of the first housing part to define the overlap region of the two-piece housing.

10. The differential gear of claim 9 wherein the peripheral seam extends between the first enlarged portion of the first housing part, the second enlarged portion of the second housing part and the opposite end faces of the bolt.

\* \* \* \* \*